United States Patent [19]

Fohrhaltz et al.

[11] 3,925,722

[45] Dec. 9, 1975

[54] WEAR INDICATOR FOR VACUUM CIRCUIT INTERRUPTER

[75] Inventors: Howard A. Fohrhaltz, Lanesborough; Richard D. Blackburn, Dalton, both of Mass.

[73] Assignee: General Electric Company

[22] Filed: May 1, 1972

[21] Appl. No.: 249,136

[52] U.S. Cl. ........... 324/28 R; 200/167 R; 33/172 E
[51] Int. Cl.² ..................... G01R 31/02; H01H 9/16
[58] Field of Search ......... 324/28 R, 28 CB, 28 CR, 324/65 R, 71 R, 71 E; 33/169 B, 174 L, 180 AT, 147 N, 149 J, 172 E; 73/104; 200/167 R; 335/17

[56] References Cited
UNITED STATES PATENTS

| | | | |
|---|---|---|---|
| 1,485,429 | 3/1924 | Powell | 33/180 AT |
| 1,688,330 | 10/1928 | Gunther | 33/172 E |
| 1,971,196 | 8/1934 | McNairy | 324/28 CB |
| 2,640,274 | 6/1953 | Crosby | 33/172 E |
| 3,058,225 | 10/1962 | Ward | 33/169 B |
| 3,619,533 | 11/1971 | McFarland | 200/167 R |

Primary Examiner—R. V. Rolinec
Assistant Examiner—R. Hille
Attorney, Agent, or Firm—Francis X. Doyle

[57] ABSTRACT

A device for indicating the wear of the contacts in a vacuum interrupter. A pivoted lever arm is provided, one end of which engages a pin on the movable contact of a vacuum interrupter. The other end is attached to the sliding contact of a potentiometer. As the contacts wear, the movable contact moves closer into the vacuum interrupter, thereby pivoting the lever and changing the resistance of the potentiometer. A voltmeter connected to the slide wire and one end of the potentiometer provides an indication of contact wear. If desired, an alarm or an automatic stop could be connected to the indicator.

4 Claims, 2 Drawing Figures

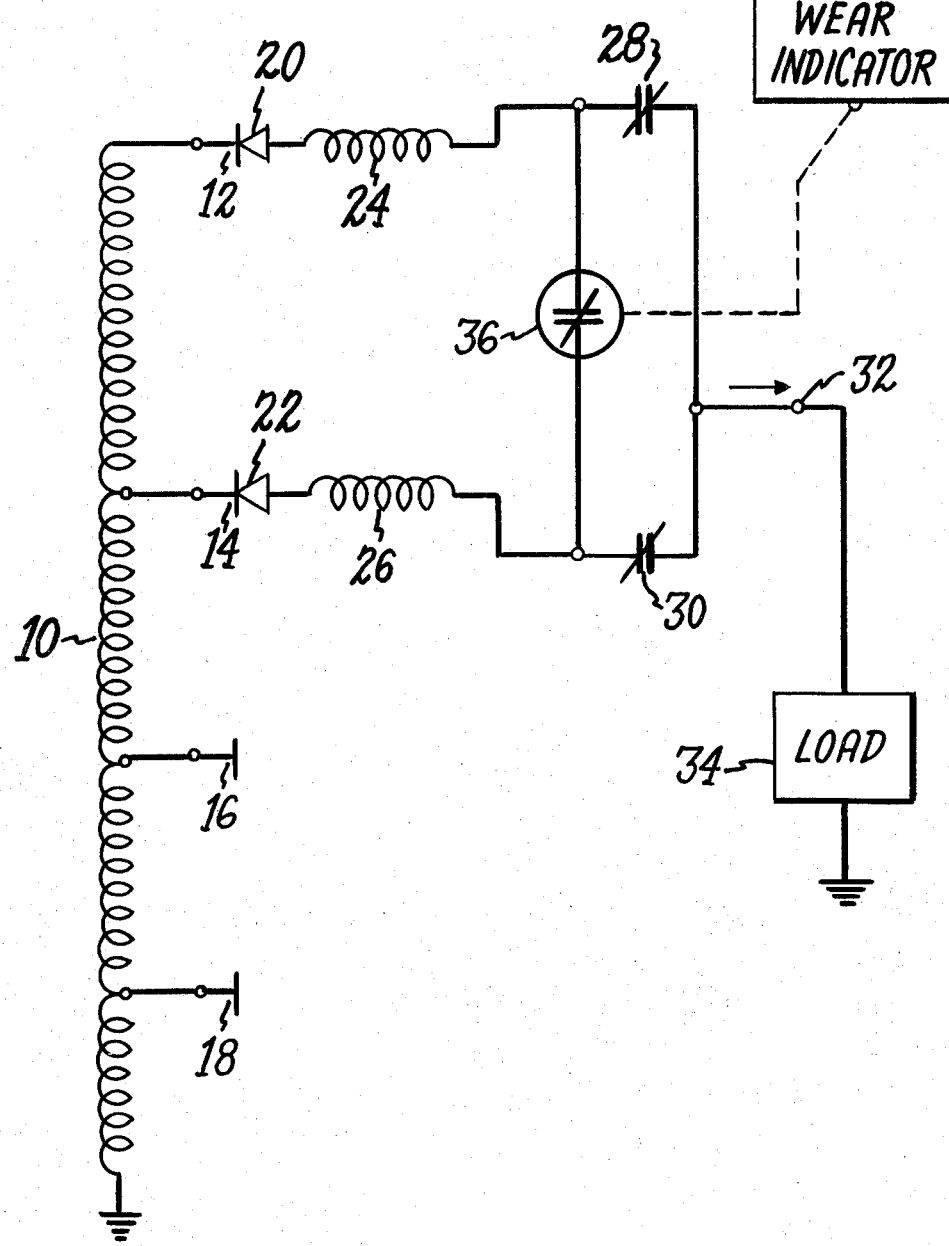

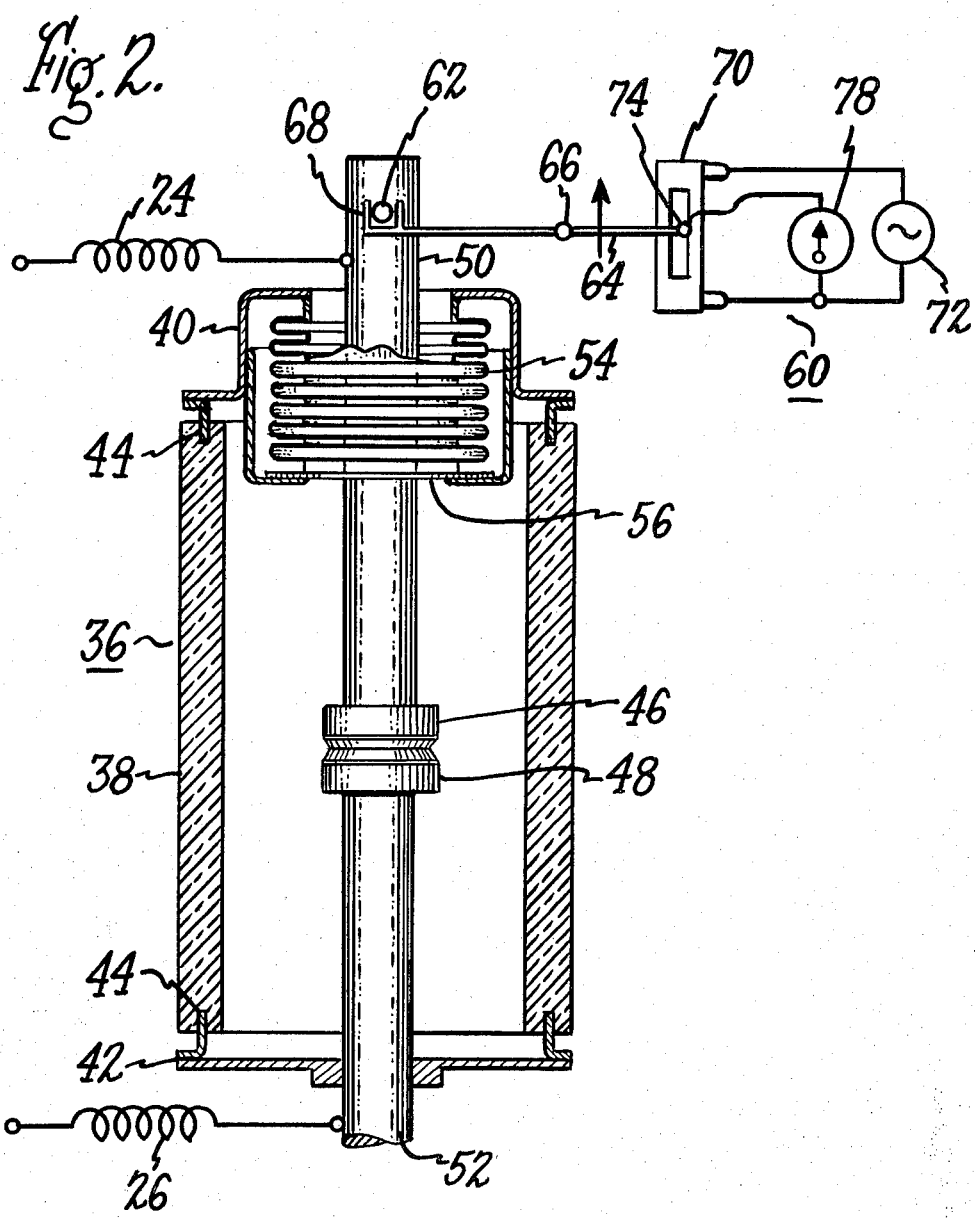

WEAR INDICATOR FOR VACUUM CIRCUIT INTERRUPTER

BACKGROUND OF THE INVENTION

This invention relates to a wear indicator and more particularly to a wear indicator for indicating the contact wear inside a vacuum electric circuit interrupter.

As is well known, vacuum interrupters are utilized in many types of switching circuits, for example, in many types of load tap changing circuits which are utilized with oil immersed electrical apparatus, for example, transformers or regulators. A typical vacuum interrupter circuit including a bypass switch is shown, for example, in U.S. Pat. No. 3,524,033 dated Aug. 11, 1970 and assigned to the same assignee as this invention. With the use of vacuum interrupting devices for closing switches, such as in tap changer devices, the contacts are subject to arcing when the circuit is opened and closed. As is understood, when contacts are opened and closed within a vacuum, the arcing is quickly extinguished at current zero. However, due to the continuous use, the contacts wear due to the arcing duty and after a certain number of arcs or use of the circuit interrupter, the contacts wear sufficiently such there might not be adequate circuit closing at the end of a tap change and would provide continuous arcing within the circuit interrupter and consequent damage or inoperation of the transformer or regulator.

As is well understood by those skilled in the art, many attempts have been made to provide a wear indicator for use with contacts in interrupting circuits and particularly in the vacuum interrupters since it is extremely difficult to monitor contacts of the interrupter. They are normally mounted within a vacuum bottle and removed from easy observation. In the prior art, there have been devices which utilize an indicator on the shaft of the movable contact in conjunction with a line or other device such that when the line engages, or is aligned with, the indicator it will provide an indication that the movable contact has moved too far into the vacuum bottle and thus the contacts have worn. However, this does require an opportunity to observe the shaft of the movable contact. Normally when this is mounted within a transformer or voltage regulator under the oil it is generally difficult to adequately observe the movement of the movable contact and, therefore, does not provide an easy method of wear indicator.

It has recently been discovered that a combined mechanical and electrical wear indicator may be readily provided, having a mechanical connection to the movable contact of the vacuum interrupter with the mechanical connection also connected to an electrical device for operation of a potentiometer which will then, in conjunction with a voltmeter, adequately show the wear on the contacts of the vacuum interrupter.

It is, therefore, one object of this invention to provide a simple, inexpensive means for continuously indicating the wear on the contacts of a vacuum circuit interrupter.

A still further object of this invention is to provide a mechanical connection to the movable contact of a vacuum interrupter for operating an electrical device to provide an indication of the wear of the contacts of such vacuum interrupter.

A still further object of this invention is to provide a wear indicator for vacuum interrupters wherein a mechanical connection may be made to the vacuum interrupter and by use of electrical indication the desired wear indication of the contacts may be provided in a remote area, remote from the vacuum interrupter, which may be sealed within an electrical device.

BRIEF SUMMARY OF THE INVENTION

Briefly, in one form, this invention comprises a wear indicator for indicating wear on the contacts of a vacuum interrupter. The wear indicator is in the form of a mechanical connection to engage the movable contact of the vacuum interrupter. The mechanical connection is in turn connected to an electrical resistor wherein movement of the movable contact of the vacuum interrupter in one direction causes the mechanical connection to change the resistance of the electrical resistor. The change in resistance is indicated on a voltmeter which is connected to the electrical resistor and the reading of the voltmeter provides a desired indication of the wear on the contacts of the vacuum interrupter. If desired, either an alarm or an automatic stop may be connected with the electrical indicator.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment, particularly when considered in the light of the accompanying drawings.

BRIEF DESCRIPTION OF DRAWINGS

FIG. 1 is a schematic diagram of a tap changing device such as may be found in a regulator or transformer using a vacuum interrupter and showing the use of the wear indicator of this invention; and FIG. 2 is an illustration of a vacuum circuit interrupting device in axial cross section showing the wear indicator of this invention.

DESCRIPTION OF PREFERRED EMBODIMENT

As noted, this invention relates to a wear indicator for indicating the wear of the contacts of a vacuum interrupter device. This vacuum interrupter is used frequently in tap changing devices in electrical inductive apparatus such as, for example, transformers, regulators and the like. The device is shown in FIG. 1 in connection with a tap changing circuit showing the vacuum interrupter in circuit with the tap changing circuit, while FIG. 2 of the invention shows essentially the features of the wear indicator which are believed patentable.

Reference will now be made to the drawing in which like numerals are used to indicate like parts throughout the various views and first considering FIG. 1, a tapped transformer winding 10 is shown having a plurality of stationary tap contacts 12, 14, 16 and 18. As is shown, the tap selector contacts 20 and 22 are connected through reactor coils 24 and 26 and bypass switches 28 and 30, respectively, to a contact 32 which is connected to a load 34. A vacuum interrupter switch 36 is shunted across the parallel circuit which includes the bypass switches 28 and 30. As is well understood by those skilled in the art, when it is desired to change from one tap to another on the tap changer, for example, from tap 12 to tap 14, the bypass switch 28 will be opened thus shunting the current from contacts 12, 20 through the vacuum interrupter 36 to the load 34. The vacuum interrupter 36 must then be opened prior to movement of movable contact 20 to prevent current flow through contact 12,20 and thus preventing arcing therebetween. As will be understood, when the vacuum interrupter 36 opens, the contacts of the interrupter do develop arcing therebetween due to breaking of the load. These arcs are readily extinguished during current zero and then as will be understood are prevented from reigniting because of the existing vacuum within the vacuum interrupter. Of course, when the contact 20 reaches fixed contact 14, then the vacuum interrupter 36 would be closed to divide the current through movable contacts 20, and 22. Bypass switch 28 will then be closed relieving the vacuum interrupter 36 of the current carrying duty.

The above description is well known and is found, for example, in U.S. Pat. No. 3,524,033 mentioned previously.

In order to provide an indication of the wear between the contacts of the vacuum interrupter 36, the wear indicator 60 of this invention may be provided connected to the movable contact of the circuit interrupter. The operation and connections of the preferred form of wear indicator of this invention are best shown in FIG. 2 of the drawing. As is shown in FIG. 2, the vacuum interrupter 36 is an evacuated housing envelope which is formed generally of a tubular insulating shell 38 and a pair of metal endcaps 40 and 42. As is shown, the endcaps 40 and 42 are connected to the insulating shell 38 by hermetic seals indicated at 44 and the caps are each provided with a central aperture to permit passage through the cap of the contact rod of the contacts of the circuit interrupter 36.

Within the envelope 38 are the pair of contacts 46, 48 with contact 46 being movable and connected to the movable contact arm 50 while contact 48 is fixed and is connected to the fixed contact arm 52. As is shown, the fixed contact 48 and arm 52 are connected to reactor 26 while movable contact 46 and arm 50 are connected to reactor 24. This is merely to relate the vacuum interrupter 38 to FIG. 1 of the drawing. Obviously, the connections could be in any manner desired.

As can be seen, the contact rod 50 of movable contact 46 passes through an aperture in the endcap 40 and is mounted for movement into and out of contact engaging position. In order to provide a hermetic seal to the arm 50, a flexible metallic bellows 54 is provided. As is shown, the metallic bellows 54 is generally tubular surrounding the contact rod 50 and being closed at its upper end by a plate 56. The plate 56 is hermetically sealed to the contact rod 50 by a weld or other means. The open end of bellows 54 is seated in the endcap 50 and is sealed to such endcap, generally as by welding. Because the bellows 50 forms a wall portion of the evacuated envelope 38, the pressure difference between the inner and outer surfaces of the bellows 54 normally expands the bellows and biases the contact rod 50 and contact 46 into contact engagement with the fixed contact 48. The means of actuating the contact interruption of the circuit interrupter is not shown since any one of a number of methods may be provided all of which are well known and do not form any part of this invention.

In order to provide for an indication of the wear between contacts 46 and 48, a wear indicator is provided and indicated by numeral 60 in FIG. 2. As is shown, a pin 62 is provided on the movable contact rod 50. A pivoted lever arm 64 pivoted at a pivot point 66 within the electrical device (not shown) has one end in the form of a U-shaped portion 68 which surrounds pin 62 as is clearly seen in FIG. 2. As can be seen, the U-shaped portion 68 of the lever arm 64 is open on the top such that whenever the vacuum interrupter is open by movement of contact arm 50, there will be no engagement between pin 62 and U-shaped portion 68 of the lever arm 64. However, when the contact rod 50 returns member 46 to closed position, then the pin will engage U-shaped portion 68 and any wear between contacts 46 and 48 as is understood will cause pivoting of rod 64 about pivot 66. While U-shaped portion 68 has been shown engaging pin 62, it will be apparent that a semi-circular portion, or even a straight edge of lever arm 64 would suffice. It is desirable that the connection between pin 62 and lever arm 64 be such that the lever arm 64 is only moved as the contacts wear. Opening of the contacts should not affect lever arm 64.

A potentiometer 70 is provided with the opposite ends of the potentiometer connected to a constant source of voltage indicated at 72. The other end of pivoted lever 64 is connected to the slide portion 74 of the potentiometer 70. As will be apparent from FIG. 2, as pin 62 forces portion 68 down, the lever arm 64 will pivot about pivot 66 thereby moving lever arm 64 and the slide wire 74 in an upward direction as is shown by the arrow in FIG. 2. As will be understood, this will increase the resistance of the potentiometer 70 between slide wire 74 and the lower end 76 of resistor 70. With a voltmeter 78 connected between slide wire 74 and end 76 of the resistor, the increased resistance in potentiometer 70 will show a greater voltage drop across that portion of the resistor and therefore the voltmeter 78 will provide for a higher voltage reading. This, as will be understood, will be readily calibrated into distance and a determination made as to when the maximum amount of wear allowable has obtained between the contacts 46 and 48 of the vacuum interrupter 36 and, therefore, provide for a changeout of the interrupter or renewing of the contacts as is desired. Of course, as will be understood, a voltmeter could be connected in the opposite direction, that is, between the upper end of resistor 70 and slide wire 74. This would, of course, show a lower resistance between the slide wire and the upper end of the resistor and, therefore, a lower voltage but, of course, the meter could be calibrated so as to provide the desired wear indication regardless of which direction the voltage reading is taken.

Of course, as will be understood, if desired, an alarm member can be connected in with the voltmeter such that when the voltmeter reaches a given reading it would close contacts to thereby ring an alarm, for example, an alarm such as is set forth in U.S. Pat. No. 3,641,359 of Feb. 8, 1972 which patent is assigned to the same assignee as this invention. In the same manner, an automatic stop could be provided also in the manner indicated in the above noted patent, such that when the wear of the contacts reached a given point which would open or close a set of contacts such that the circuit would be automatically opened to prevent further use of the vacuum interrupter until such time as a replacement were made.

While there has been shown and described the present preferred embodiment of this invention, it will of course be understood that many modifications may be made. For example, while the invention has been described specifically with reference to vacuum interrupters, it will of course be understood that the invention could be utilized in any type of contacts hidden within an electrical induction device such as a transformer where the indication of wear of contacts was desirable and it was necessary to provide this indication on the external portion of the electrical induction device. As will be understood, all such changes are considered to fall within the spirit and scope of the invention as it is specifically set forth in the appended claims.

What is claimed as new and which it is desired to secure by Letters Patent of the United States is:

1. A wear indicator for indicating the wear between the fixed contact and the movable contact of a switch device, said wear indicator comprising a lever, one end of said lever being mechanically connected to said movable contact, the other end of said lever being connected to the slide wire of an electrical resistance, said lever being pivoted about a pivot secured to said lever between said ends, a source of voltage connected across said resistor, an electrical meter connected between said slide wire and one end of said electrical resistance, movement of said movable contact into said fixed contact because of contact wear pivoting said lever, moving said slide wire along said electrical resistance to thereby change the reading of said electrical meter to indicate the wear of said contacts.

2. A wear indicator as set forth in claim 1 in which said mechanical connection between said lever and said movable contact comprises a pin on said movable contact, said pin engaging said lever when said contacts are closed, but disengaged from said lever when said contacts are opened.

3. A wear indicator as set forth in claim 1 in which said mechanical connection between said lever and said movable contact comprises a pin on said movable contact and a U-shaped portion on said lever engaging said pin when said contacts are closed, but disengaged from said pin when said contacts are opened.

4. A wear indicator as set forth in claim 1 in which said switch device is a vacuum circuit interrupter.

* * * * *